M. SAVIERS & W. N. AYERS.
CORN PLANTER.

No. 47,987. Patented May 30, 1865.

Witnesses:

Inventor;

UNITED STATES PATENT OFFICE.

MATILDA SAVIERS (ADMINISTRATRIX OF THE ESTATE OF M. SAVIERS, DECEASED,) AND W. N. AYERS, OF WYANDOTTE, KANSAS.

IMPROVEMENT IN CORN-PLANTERS.

Specification forming part of Letters Patent No. 47,987, dated May 30, 1865.

*To all whom it may concern:*

Be it known that M. SAVIERS and W. N. AYERS, of Kansas City, in the county of Jackson and State of Missouri, have invented a new and Improved Corn-Planter; and we do hereby declare that the following is a full, clear, and exact description thereof, which will enable others skilled in the art to make and use the same, reference being had to the accompanying drawings, forming part of this specification, in which—

Figure 1:
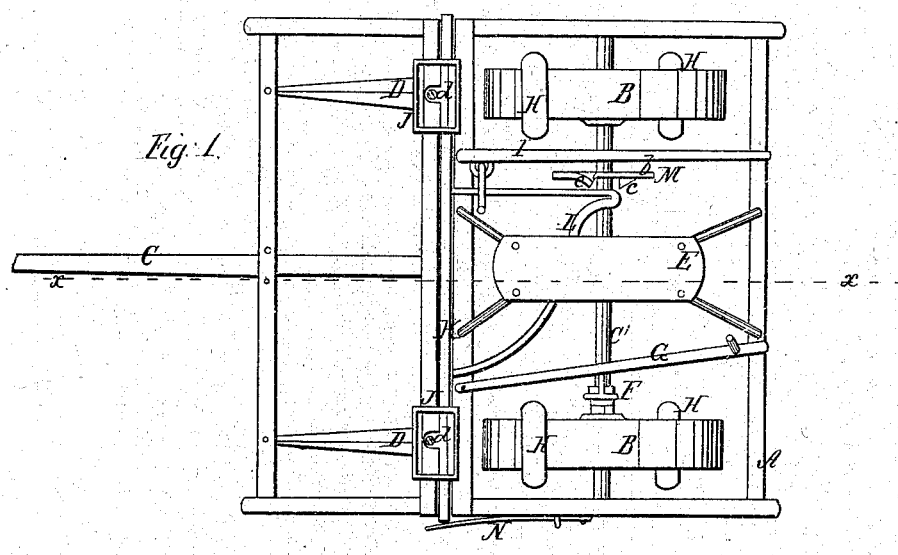
Figure 2:
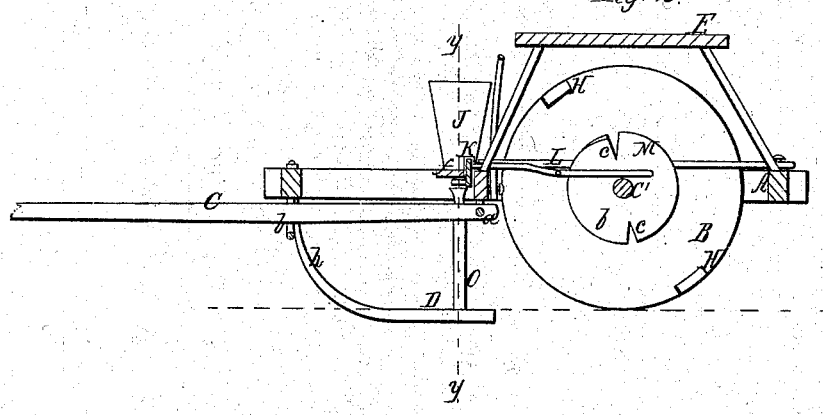
Figure 3:
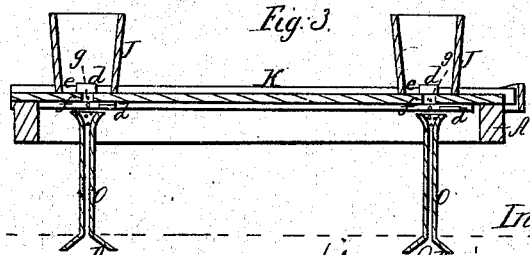

Figure 1 is a plan or top view of the invention; Fig. 2, a side sectional view of the same, taken in the line $x\ x$, Fig. 1; Fig. 3, a transverse vertical section of the same, taken in the line $y\ y$, Fig 2.

Similar letters of reference indicate like parts.

This invention relates to a new and improved marking device, whereby the corn may be planted in check-rows without previously marking the ground.

The invention also relates to an improved seed-dropping device and to an improved seed-covering arrangement, whereby the seed may be dropped or planted with certainty by an automatic mechanism and covered with earth in a proper manner.

A represents a rectangular frame, which is mounted on two wheels, B B', and has a draft-pole, C, secured to its under-side by a pivot, $a$, said pole passing through a staple or loop, $b$, at the under side of the front part of the frame of sufficient length to admit of the front part of the frame being tilted upward to raise the plows D out of the ground when necessary, which is done by the driver placing himself back on the seat E on the frame. The plows are raised out of the ground in turning the machine at the ends of rows, and when this is done the left wheel, B', is made loose on its axle C' by drawing a box, F, out from the center of said wheel by means of a lever, G. This loosening of the wheel B' facilitates the turning of the machine, and the box is inserted or shoved into the wheel as soon as the machine is turned and the markers H on the wheel brought in line; if not so, with the rows previously planted before the machine is started. This is done by showing a lever, I', under one of the markers of the wheel B, which prevents the wheels from turning until the markers are brought in line with the rows. The markers H are simply flat strips or plates attached to the peripheries of the wheels B B', two on each wheel.

J J are two seed-boxes placed on the frame A, one at each side directly in front of the wheels B B', and directly behind the cross-bar $a$, on which the seed-boxes J are secured, there is placed a slide, K, which has a bar, L, projecting from its rear side, against which a cam, M, on the axle C' bears, said cam being composed of a circular plate, $b$, having two projections, $c\ c$, upon it. The bar L is kept in contact with the cam by means of a spring, N, which bears against one end of it, and a reciprocating motion is given the slide by means of the cam and spring.

The slide K has two small projections, $d\ d'$, attached to its front side, near each end. The projections $d$ pass through slots $e$ in the seed-boxes, just above their bottoms $f$, while the projections $d'$ are below the bottoms. These projections $d\ d'$ of each seed-box are a little out of line with each other, so that when the projections $d$ cover a hole, $g$, in the bottom of each seed-box the projections $d'$ will be out of line with said holes, and vice versa. By this means the seed is discharged from the hoppers and into tubes O O. The upper projections $d$ may be made in the form of brushes to prevent the bruising of the seed. By this arrangement it will be seen that an automatic seed-dropping mechanism is obtained, and one which requires no particular care or attention on the part of the driver.

The plows D are of inverted-V form in their transverse section, gradually narrowed from their rear to their front ends, curved upward in front and attached to rods $h$, which are connected to the front end of the frame A. The tubes O O are connected to the rear parts of the plows D, and the latter work beneath the surface of the ground, so that the seed will be covered when dropped, the wheels B B' serving as rollers for the same.

The markers H designate the places where the seed is dropped, and in commencing rows the markers are brought in line with the hills previously dropped. The seed therefore cannot fail to be planted in check-rows.

Having thus described this invention, we claim as new and desire to secure by Letters Patent—

The reciprocating slide K, provided with the projections d d', arranged to work in relation with the perforated bottoms of the seed-boxes J, in connection with the cam M, bar L, and spring N, all arranged substantially as and for the purpose specified.

MATILDA SAVIERS.
WILLIAM N. AYERS.

Witnesses for Matilda Saviers:
I. M. FUNK,
Dr. ISAIAH MOORE.

Witnesses for W. N. Ayers:
D. PERCIVAL,
I. N. THOMAS.